US009211688B1

(12) United States Patent
Jeung et al.

(10) Patent No.: US 9,211,688 B1
(45) Date of Patent: Dec. 15, 2015

(54) NON-WOVEN FIBERS-IN-FIBERS FROM MELT-BLOWN POLYMER BLENDS

(71) Applicants: CUMMINS FILTRATION IP, INC., Columbus, IN (US); Regents of the University of Minnesota, Minneapolis, MN (US)

(72) Inventors: Soondeuk Jeung, Cookeville, TN (US); Dawud H. Tan, Lakeland, MN (US); Feng Zuo, Elmsford, NY (US); Frank S. Bates, St. Louis Park, MN (US); Christopher W. Macosko, Minneapolis, MN (US); Zaifei Wang, Lauderdale, MN (US)

(73) Assignees: CUMMINS FILTRATION IP, INC., Columbus, IN (US); REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 156 days.

(21) Appl. No.: 14/049,303

(22) Filed: Oct. 9, 2013

Related U.S. Application Data

(60) Provisional application No. 61/711,601, filed on Oct. 9, 2012.

(51) Int. Cl.
*D01D 5/40* (2006.01)
*D01D 5/28* (2006.01)
*D01D 5/098* (2006.01)
*B29D 99/00* (2010.01)

(52) U.S. Cl.
CPC .......... *B29D 99/0078* (2013.01); *D01D 5/0985* (2013.01); *D01D 5/28* (2013.01); *D01D 5/40* (2013.01)

(58) Field of Classification Search
None
See application file for complete search history.

(56) References Cited

U.S. PATENT DOCUMENTS

| 5,290,626 A * | 3/1994 | Nishioi et al. ................. 442/201 |
| 5,786,284 A * | 7/1998 | Matsuoka et al. ............. 442/334 |
| 2008/0163469 A1* | 7/2008 | Tanaka et al. .................... 28/104 |
| 2010/0007042 A1* | 1/2010 | Simmonds ............... 264/172.13 |
| 2010/0176051 A1* | 7/2010 | Shimagaki ..................... 210/437 |
| 2010/0247908 A1* | 9/2010 | Velev et al. ..................... 428/365 |

* cited by examiner

*Primary Examiner* — Mary F Theisen
(74) *Attorney, Agent, or Firm* — Foley & Lardner LLP

(57) ABSTRACT

Methods for preparing composite non-woven fibers-in-fibers, otherwise referred to as composite polymeric fibers having an island-in-sea morphology, are described. The composite polymeric fibers may be prepared by a method that includes melt-blowing a blend of a first polymer and an immiscible second polymer to form the composite polymer fibers. The first polymer forms a matrix that surrounds the second polymer. Typically, the second polymer forms nanofibers within the matrix of the first polymer. The composite polymeric fiber may be treated with a solvent that selectively dissolves the matrix of the composite polymeric fiber and that does not dissolve the nanofibers of the composite polymeric fiber, and the nanofibers then may be collected for further treatment or use.

24 Claims, 12 Drawing Sheets (A)

(B)

(A)  (B)

(C)

(A)  (B)

NON-WOVEN FIBERS-IN-FIBERS FROM MELT-BLOWN POLYMER BLENDS

CROSS-REFERENCE TO RELATED PATENT APPLICATIONS

The present application claims the benefit under 35 U.S.C. §119(e) to U.S. Provisional Patent Application No. 61/711,601, filed on Oct. 9, 2012, the content of which is incorporated herein by reference in its entirety.

BACKGROUND

The disclosed subject matter relates to polymeric fibers produced by melt-blowing. In particular, the disclosed subject matter relates to composite polymeric fibers produced by melt-blowing a blend of a first polymer and an immiscible second polymer. The composite fiber has an island-in-sea morphology and comprises nanofibers surrounded by a matrix that is selectively soluble by a suitable solvent.

Melt-blowing refers to a polymer laid process whereby streams of molten polymer are subject to hot, high-velocity air to produce a web consisting of fine fibers. Generally, melt-blowing requires five components: an extruder, a metering pump, a die assembly, an air manifold, and a collector. In melt-blowing, a polymer resin is fed into the extruder where it is heated and melted until an appropriate temperature and viscosity are achieved. The molten polymer then is fed to the metering pump which regulates feed rate of the molten polymer to the die assembly. Fine fibers are formed as the molten polymer exits the die assembly and is hit with a stream of hot, high velocity air from the air manifold. The fine fibers then are collected on a collecting device such as a moving screen or a drum.

Here, a polymer blend is utilized in a melt-blowing process to prepare a composite polymeric fiber which has an island-in-sea morphology and comprises nanofibers surrounded by a matrix that is selectively soluble by a suitable solvent. The composite polymeric fiber may be treated with the suitable solvent in order to selectively dissolve the matrix and to obtain the nanofibers.

SUMMARY

Disclosed are methods for preparing composite non-woven fibers-in-fibers, otherwise referred to as composite polymeric fibers having an island-in-sea morphology. The composite polymeric fibers may be prepared by a method that includes melt-blowing a blend of a first polymer and an immiscible second polymer to form the composite polymer fibers. The first polymer forms a matrix that surrounds the second polymer. Typically, the second polymer forms nanofibers within the matrix of the first polymer.

The disclosed methods may include an additional step whereby the composite polymeric fiber is treated with a solvent that selectively dissolves the matrix of the composite polymeric fiber and that does not dissolve the nanofibers of the composite polymeric fiber (i.e., a selective solvent). The nanofibers then may be collected for further treatment or use.

The disclosed methods utilize a mixture of a first polymer and an immiscible second polymer in a melt-blowing process. The miscibility or compatibility of the first polymer and the second polymer may be assessed by utilizing solubility parameters as known in the art. In some embodiments, a solubility parameter ($\delta$) for polymer A (i.e., $\delta_A$) and polymer B (i.e., $\delta_B$) are obtained, and an interaction parameter ($\chi$) may then be calculated based on the following equation: $\chi_{AB} \sim (\delta_A - \delta_B)$.

In the disclosed methods, operational variables may be selected in the melt-blown process to obtain nanofibers having suitable characteristics for a given application. Variables may include "on-line" variables and/or "off-line" variables. On-line variables may include, but are not limited to polymer temperature or polymer-blend temperature ($T_p$), air temperature ($T_a$), die temperature ($T_d$), polymer or polymer-blend mass flow rate ($m_p$), air mass flow rate ($\phi_a$), pressure at die exit (P), and die-to-collector distance. Off-line parameters may include, but are not limited to die hole-size, die set-back, air gap, air angle, web collection type, and polymer/air distribution.

PBT/PECTFE 70/30. (c) PBT/PECTFE 60/40. (d) PS/PBT 75/25 v. (e) PS/PECTFE 73/27 v. (f) PBT/PECTFE-g-MA 80/20.

DETAILED DESCRIPTION

Disclosed are methods for preparing composite non-woven fibers-in-fibers, otherwise referred to as composite fibers having an island-in-sea morphology. The disclosed subject matter may be defined and further described as follows.

Unless otherwise noted, the terms used herein are to be understood according to conventional usage by those of ordinary skill in the relevant art. In addition to the definitions of terms provided below, it is to be understood that as used in the specification, embodiments, and in the claims. "a", "an", or "the" can mean one or more, depending upon the context in which it is used.

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus ≤10% of the particular term and "substantially" and "significantly" will mean plus or minus >10% of the particular term.

As used herein, the terms "include" and "including" have the same meaning as the terms "comprise" and "comprising." These terms should be interpreted to be "open-ended" unless otherwise specified.

The presently disclosed subject matter relates to melt-blowing technology for preparing nanofiber materials. Melt-blowing technology has been described. (See, e.g., Ellison et al., Polymer, 48 (2007) 3306-3316; and Dutton et al., J. Textile and Apparel, Technology and Management, Volume 6, Issue 1, Fall 2008, the contents of which are incorporated herein by reference in their entirety.)

In the presently disclosed methods, a polymer blend is melt-blown in order to prepare a composite fiber material having an island-in-sea morphology in cross-section. Fibrillar composites having island-in-sea morphology have been described. (See, e.g., U.S. Pat. Nos. 5,366,804 and 8,105,682; the contents of which are incorporated herein by reference in their entireties).

Figure 1:
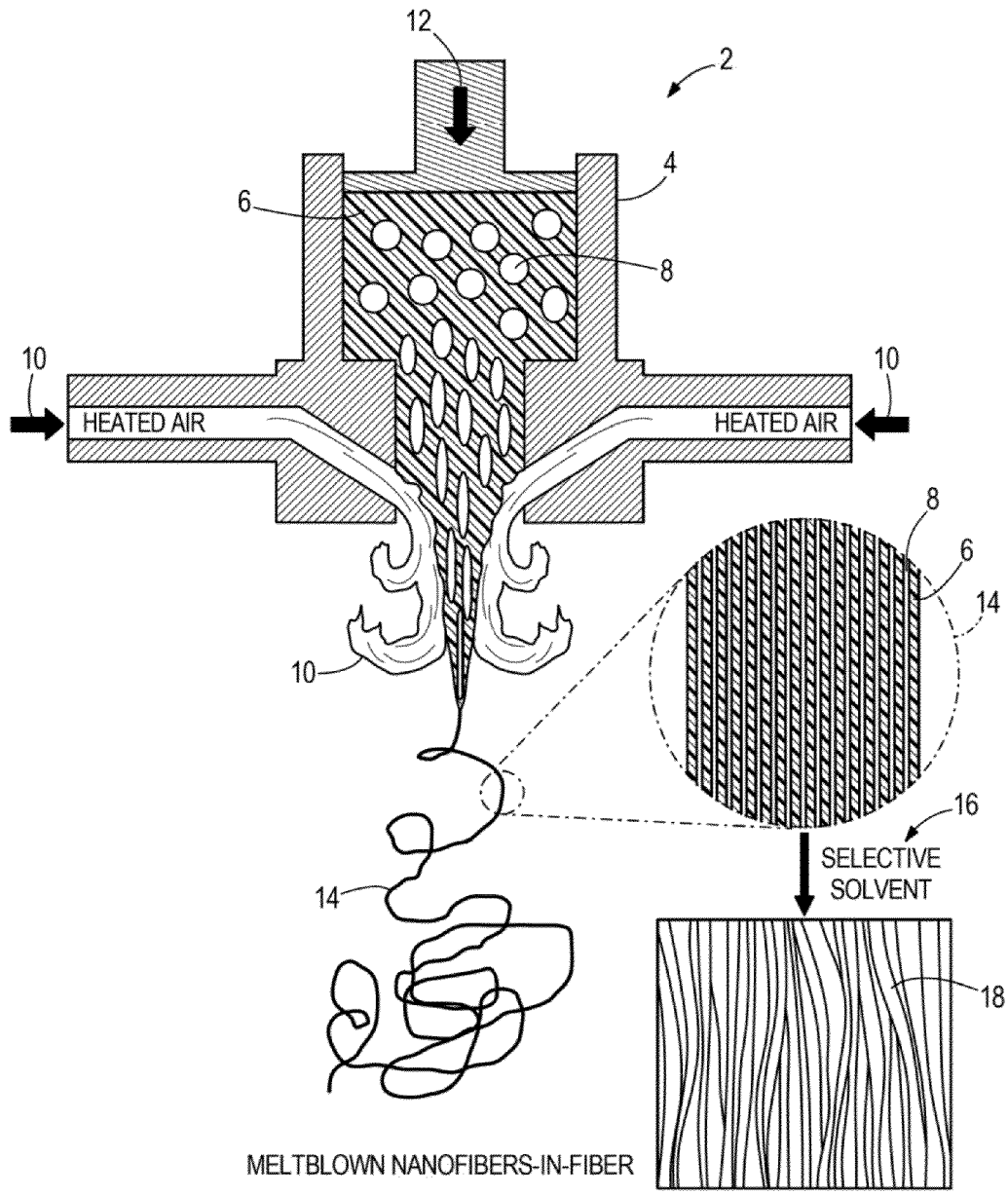
FIG. 1. Schematic of one embodiment of nanofibers-in-fiber fabrication by melt blowing as contemplated herein.

Referring to FIG. 1, disclosed is schematic 2 of one embodiment of nanofibers-in-fiber fabrication by melt blowing as contemplated herein. A blend of a first polymer 6 and an immiscible second polymer 8 is extruded 12 through a die 4 and subjected to heated air 10 as the blend exits the die to form a composite polymer fiber 14. In the composite polymeric fiber 14, the first polymer 6 forms a matrix that surrounds the second polymer 8. Typically, the second polymer 8 forms nanofibers within the matrix of the first polymer 6. The composite polymeric fiber 14 is treated with a solvent 16 that selectively dissolves the matrix of the composite polymeric fiber and that does not dissolve the nanofibers of the composite polymeric fiber (i.e., a selective solvent) to obtain nanofibers 18.

The presently disclosed composite fibers typically include a first polymer that forms a matrix that surrounds a second polymer which forms nanofibers within the matrix of the first polymer. Preferably, the nanofibers have a mean effective diameter of less than about 900 nm, 800 nm, 700 nm, 600 nm, 500 nm, 400 nm, 300 nm, 200 nm, or 100 nm.

The disclosed nanofibers preferably are relatively long relative to their mean effective diameter. For example, the disclosed nanofibers may be characterized an aspect ratio defined as mean effective length/mean effective diameter, where the disclosed nanofibers have an aspect ratio of at least about 100, 500, 1000, 5000, 10000, 50000, or 100000.

The disclosed methods may be utilized to prepare nanofibers having a suitable basis weight. In some embodiments, the nanofibers have a basis weight of about 1-500 g/m$^2$, 3-500 g/m$^2$, 5-500 g/m (or about 10-350 g/m$^2$, or about 20-200 g/m$^2$, or about 30-100 g/m$^2$).

The methods typically include melt-blowing a blend of a first polymer and an immiscible second polymer. The first polymer and the second polymer may be present in the blend at any suitable volume ratio, which is defined as first polymer: second polymer. Suitable volume ratios may include, but are not limited to 95:5, 90:10, 85:15, 80:20, 75:25, 70:30, 65:35, 60:40, and 50:50 and ranges extending therebetween. For example, suitable volume ratio ranges may include, but are not limited to 95:5 to 50:50; and 80:20 to 60:40.

The disclosed methods may utilize any suitable first polymer and any suitable, immiscible second polymer. Suitable polymers for the first polymer and the second polymer may include, but are not limited to polypropylene, polystyrene (PS), polyesters, polyurethane, polyamides, polyethylene, polycarbonate, polybutylene terephthalate (PBT), polyphenylene sulfide, polymethyl pentene, polyvinyl alcohol, poly-trifluorochloroethene, poly(ethylene-co-chlorotrifluoroethylene (PECTFE), polyethylene terephthalate, poly(4-methylpentene-1), poly(tetramethylene terephthalate), and poly(methyl methacrylate). Suitable polymers for the first polymer and the second polymer may include, but are not limited to co-polymers such as ethylene/chlorotrifluoro-ethylene, copolyesters, polyurethane, ethylene vinyl acetates, and polyamide polyethers. Optionally, the polymers utilized in the methods may be modified, for example, by grafting one or more reactive side groups to the polymers. These may include but are not limited to carboxylic acid groups (e.g., maleic acid).

The blend that includes the first polymer and the immiscible second polymer further may include additives. Suitable additives may include, but are not limited to, anti-oxidants, anti-stats, blooming agents, colorants, flame retardants, lubricants, peroxides, stabilizers, and wetting agents.

The disclosed methods utilized a mixture of a first polymer and an immiscible second polymer in a melt-blowing process. The miscibility or compatibility of the first polymer and the second polymer may be assessed by utilizing solubility parameters as known in the art which may include, but are not limited to, the Hildebrand solubility parameter ($\delta$) and the Hansen solubility parameters ($\delta_d$, $\delta_p$, and $\delta_h$). (See e.g., Coleman et al., "Specific Interactions and the Miscibility of Polymer Blends: Practical Guides for Predicting & Designing Miscible Polymer Mixtures, 1991; the content of which is incorporated herein by reference in its entirety.) In some embodiments, solubility may be assessed for a blend of polymer A and polymer B by obtaining a solubility parameter for polymer A (i.e., $\delta_A$) and polymer B (i.e., $\delta_B$) and calculating an interaction parameter ($\chi$) based on the following equation: $\chi_{AB} \sim (\delta_A - \delta_B)$. A relatively high interaction parameter (e.g., $\chi > 1$) may be indicative of a relatively low compatibility and a higher likelihood of immiscibility, while a relatively low interaction parameter (e.g., $\chi < 1$) may be indicative of a relatively high compatibility and a higher likelihood of miscibility. Preferably, the calculated interactive parameter is greater than 0, more preferably greater 0.5, and even more preferably greater than 1.0. For example, poly(butylene terephthalate) (PBT) has a solubility parameter ($\delta$) of about 10.8 (cal/cm$^3$)$^{1/2}$, while poly(ethylene-co-chlorotrifluoroethylene) (PECTFE) has an estimated solubility parameter ($\delta$) of about 7.5 (cal/cm$^3$)$^{1/2}$. As such, the calculated interactive parameter for PBT and PECTFE (i.e., χ=10.8−7.5=3.3>1) suggests that these two polymers are immiscible and are suitable for the disclosed methods as a first polymer and a second polymer, respectively. Similarly, polystyrene has a solubility parameter (δ) of about 8.7 (cal/cm$^3$)$^{1/2}$, suggesting that PS is a suitable polymer for forming a blend of PS:PBT (i.e., χ=10.8−8.7=2.1>1) or a blend of PS:PECTFE (i.e., χ=8.7−7.5=1.2>1) in the disclosed methods.

In the disclosed methods, the matrix of the composite fiber optionally may be dissolved by treating the composite fiber with a solvent that is suitable for dissolving the matrix. Suitable solvents for dissolving the polymer matrix may be selected based on characteristics such as polymer solubility indexes for the polymer matrix and various solvents as disclosed in the art. Methods for predicting the solubility of polymers in solvents are disclosed in the art. (See, e.g., Askadskii et al., "On Predicting the Solubility of Polymers," Polymer Science, Vol. 32, No. 10, 1990, pages 2069-2079; and Miller-Chou et al., "A Review of Polymer Dissolution," Prog. Polym. Sci. 28 (2003) 1223-1270; the contents of which are incorporated herein by reference in their entireties.) Suitable solvents may include but are not limited to tetrahydrofuran (THF), trifluoroacetic acid (TFA), dimethylformamide (DMF), dimethylsulfoxide (DMSO), 1,1,1,3,3,3-Hexafluoroisopropanol (HFIP), toluene, 1,2,3-trichlorobenzene (TCB), chloroform, ortho-dichlorobenzene (ODCB), In some embodiments of the methods disclosed herein, a suitable solvent for a polymer matrix may be selected based on criteria that includes, but is not limited to, the Hildebrand solubility parameter (δ) and the Hansen solubility parameters ($δ_d$, $δ_p$, and $δ_h$) for the solvent and the polymer matrix. In some embodiments, a suitable solvent may have a solubility parameter (δ) that approximates the solubility parameter of the first polymer which forms the matrix of the composite fiber. For example, tetrahydrofuran (THF) has a solubility parameter of about 9.52 (cal/cm$^3$)$^{1/2}$ suggesting that it is a suitable solvent for PS and that PS is suitable as a matrix for an immiscible, second polymer such as PBT or PECTFE. Similarly, trifluoroacetic acid (TFA) may be a suitable solvent for PBT (e.g., where a blend of PBT:PECTFE is utilized to form a composite fiber with PBT forming a soluble matrix and PCECTFE forming nanofibers embedded in the matrix).

In the disclosed methods, operational on-line and/or off-line variables may be modulated to obtain nanofibers having suitable characteristics. On-line variables may include, but are not limited to polymer temperature or polymer-blend temperature ($T_p$), air temperature ($T_a$), die temperature ($T_d$), polymer or polymer-blend mass flow rate ($m_p$), air mass flow rate ($ϕ_a$), pressure at die exit (P), and die-to-collector distance. Off-line parameters may include, but are not limited to die hole-size, die set-back, air gap, air angle, web collection type, and polymer/air distribution.

In some embodiments, the processing temperature of the blend ($T_p$) is maintained at about 200-400° C. during melt-blowing (e.g., via heating the blend, the die, or both). In further embodiments, the air temperature ($T_a$) is maintained at about 200-400° C. during melt-blowing.

In some embodiments, the air mass flow rate ($ϕ_a$) is maintained between about 1-30 standard cubic feet per minute (SCFM) during melt-blowing. Preferably, $ϕ_a$ is maintained between about 2-20 SCFM, or more preferably between about 3-10 SCFM during melt-blowing.

In some embodiments, the blend may be fed to the die during melt-blowing at a mass flow rate ($m_p$) of about 0.01-2.00 g/min/hole. Preferably, $m_p$ is maintained between about 0.02-1.0 g/min/hole, or more preferably between about 0.03-0.50 g/min per hole or capillary orifice during melt-blowing.

In some embodiments, pressure at die exit (P) during melt-blowing is less than 100 psig. Preferably, P is less than 50 psig, 40 psig, 30 psig, or 20 psig during melt-blowing.

In some embodiments, the die utilized during melt-blowing has one or more orifices having diameters of about 0.05-2 mm (typically 0.1-1.0 mm, and more typically 0.2-0.6 mm).

In some embodiments, the die utilized in the melt-blowing method may have a multi-orifice design that includes a bank of holes (e.g., more than a meter in length) spaced at about 10-20 holes/cm.

EXAMPLES

The following Examples are illustrative and do not limit the scope of the claimed subject matter.

Example I

Non-Woven Nanofibers from Melt-Blown Polymer Blends

Abstract

Nonwoven fibers are a $20 billion industry due to their wide applications in filtration, absorbance, hygiene, and apparel.[1-3] Melt-blowing produces these nonwovens rapidly and economically but the process is limited to fibers ≥2 μm. Submicron fibers would dramatically increase surface area and decrease pore size, opening new applications for nonwovens.[4-7] Electrospinning can produce submicron nonwovens but production is slow and costly and the type of polymers is limited.[5] Previously, we have shown that using high air flow rates in melt blowing diameters around 0.5 μm can be obtained.[8, 9] Here, using immiscible polymer blends as starting materials for melt blowing, we demonstrate that fibers of the dispersed phase with diameters down to tens of nanometer can easily be obtained.

Introduction

Early studies on fibers made from polymer blends were focused on reinforcing mechanical properties of matrix polymers with rigid polymer microfiber fillers.[10-22] Sun and coworkers were the first to attempt to create free standing nanofibers from polymer blends using bi-component die.[23-30] They prepared binary immiscible blends containing cellulose acetate butyrate (CAB) and various thermoplastic polymers then extruded these blends through a side-by-side spinneret die followed by hot-drawing at different draw ratios. They obtained continuous filaments with diameter of hundreds of micrometers which were soaked in acetone to remove only CAB. Fibers from the dispersed thermoplastics were obtained with diameters ranging from hundreds of nanometers to several micrometers. Diameter depended primarily on interfacial tension, less on viscosity ratio but was strongly related to the processing parameters during extrusion and drawing. Utilizing this extrusion technique to produce fibers with an averaged diameter below 100 nm was challenging, requiring very low fraction of dispersed phase and high draw ratio.

Another method to create nanofibers is through melt spinning using specially designed spinnerets to combine different materials from separate melt streams. These fibers-in-fiber structures are often called "islands-in-the-sea." Research carried out by Choi and Kim and later by Fedorova and Pourdeyhimi demonstrated that islands with diameter in the order of 10$^2$ nm can be obtained.[31, 32] The smallest fibers from this technique were reported by Nakata et al., where they obtained nanofibers by heating up and drawing 44 μm islands-in-the-sea fibers, and remove polyamide sea using formic acid.[33] Poly(ethylene terephthalate) islands were initially around 0.7 μm in diameter and were drawn down to 39 nm. In addition to needing a specially designed spinneret and two extruders this method requires two separate steps with an extremely high draw ratio of about 500 in the second stage.

Experimental Results and Discussion

In contrast to these previous studies, where nanofibers-in-fiber were obtained through extrusion followed by a separate mechanical drawing, we report a new direct approach, i.e. simple one-step melt blowing of immiscible polymer blends, to fabricate nanofibers-in-fiber. As illustrated in FIG. 1, with this approach the dispersed phase inside the 3 μm fibers melt blown from polymer blends is dramatically stretched down to nanofibers.

Poly(butylene terephthalate) (PBT) (Celanex 2008 provided by Ticona) and poly(ethylene-co-chlorotrifluoroethylene) (PECTFE) (Halar 1400LC provided by Solvay) were dried overnight in a vacuum oven at 120° C. to remove moisture before melt blending in a batch compounder (Thermo Haake) at 265° C. 75 vol % PBT was blended with 25 vol % PECTFE for 10 min with roller blades equipped with a batch mixer at 100 rpm then quenched into liquid $N_2$ in order to freeze the melt morphology. Bulk samples were microtomed at room temperature to prepare sections about 60 to 90 nm thick. These sections were examined using transmission electron microscopy (TEM) (FEI Tecnai T12) without staining because F and Cl atoms in PECTFE have higher electron density and thus scatter more electrons. Polymer blends were also freeze-fractured in liquid $N_2$ then coated with 5 to 10 nm platinum and examined using scanning electron microscopy (SEM) (JEOL 6500) with backscattered electron detector.

Figure 2:
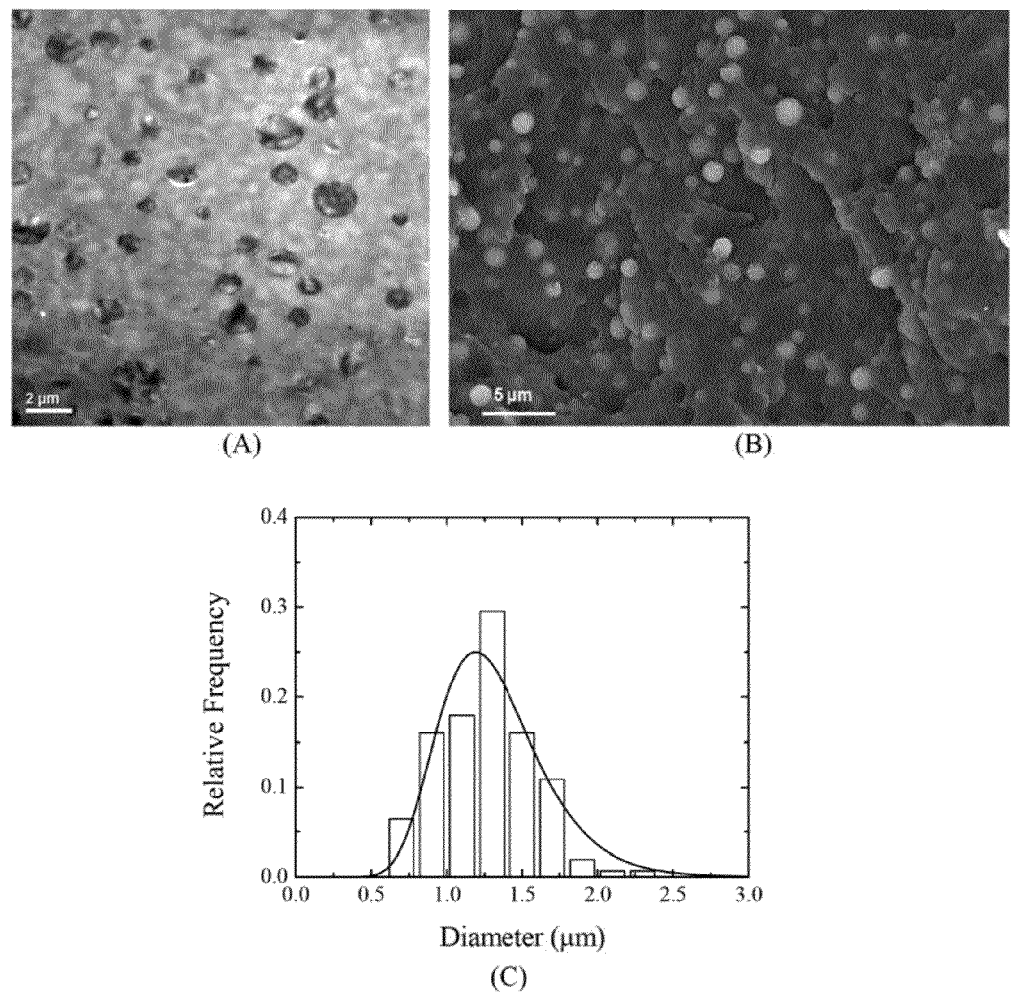
FIG. 2. (A) Transmission electron microscopy (TEM) and (B) backscattered scanning electron microscopy (SEM) images of a polybutylene terephthalate (PBT)/poly(ethylene-co-chlorotrifluoroethylene PECTFE blend. (C) Statistical analysis of PECTFE droplet size from SEM.

As the TEM image shown in FIG. 2(A), PECTFE appears as the dark phase with well-defined interface and spherical shape. The total areas of dark phase and bright phase are roughly consistent with the volume fraction of each phase in the bulk. Backscattered SEM images (FIG. 2(B)) were obtained to measure the droplet size. Again PECTFE containing F and Cl atoms with higher atomic number leads to more backscattered electrons and thus a bright phase in the SEM image. FIG. 2(C) shows the statistical analysis of diameters from over 200 droplets using ImageJ to extract diameters directly. PECTFE droplets in the PBT matrix range from about 0.5 to 2.5 μm with a number average diameter of 1.3 μm.

Figure 3:
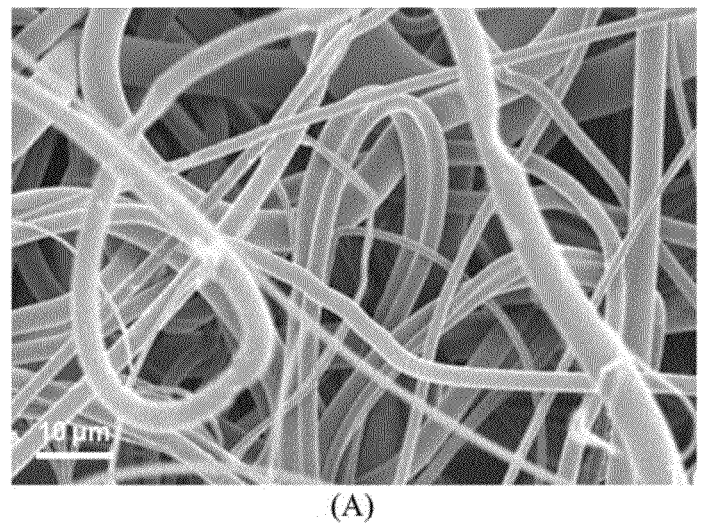
FIG. 3. (A) SEM image and (B) statistical analysis of diameters of melt blown fibers from PBT/PECTFE blend.
Figure 3:
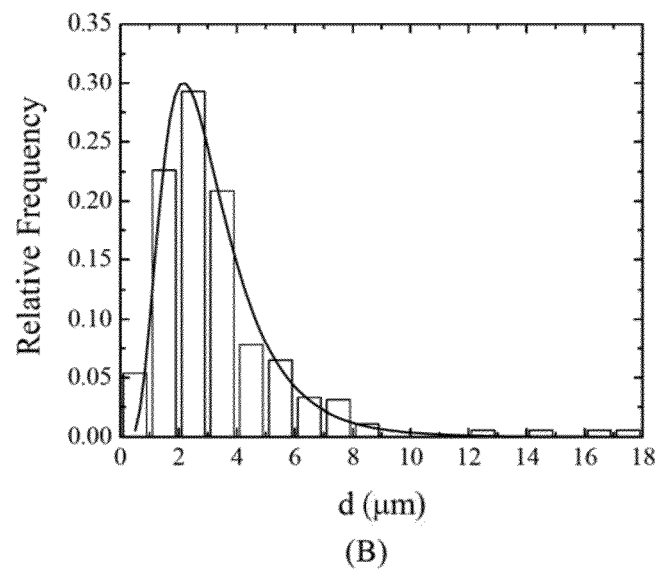

To produce nonwoven fibers, PBT/PECTFE blends were dried and loaded into our custom built lab-scale melt blowing apparatus, described in detail previously.[8, 9] Polymer blends were melt blown as soon after loading the capillary barrel as the temperature reached 265° C. (~10 min) to minimize agglomeration of dispersed droplets. Melt blowing was carried out using a 5-hole die containing 0.2 mm diameter holes with a polymer flow rate of 0.89 g/min per hole and a pressure at the die exit of 4 psig. Melt blown fibers were collected using a rotating drum located 21 cm below the melt blowing die. A representative SEM image of the product is shown in FIG. 3 along with a fiber diameter analysis. The number average fiber diameter is about 3 μm, typical for melt blowing. However, compared to melt-blown fibers of neat PBT, the distribution of fiber diameters generated by the blend is less uniform and relatively broad.[9] These characteristics might be attributed to the high segregation strength between PBT and PECTFE causing more instability during the drawing processing.

Figure 4:
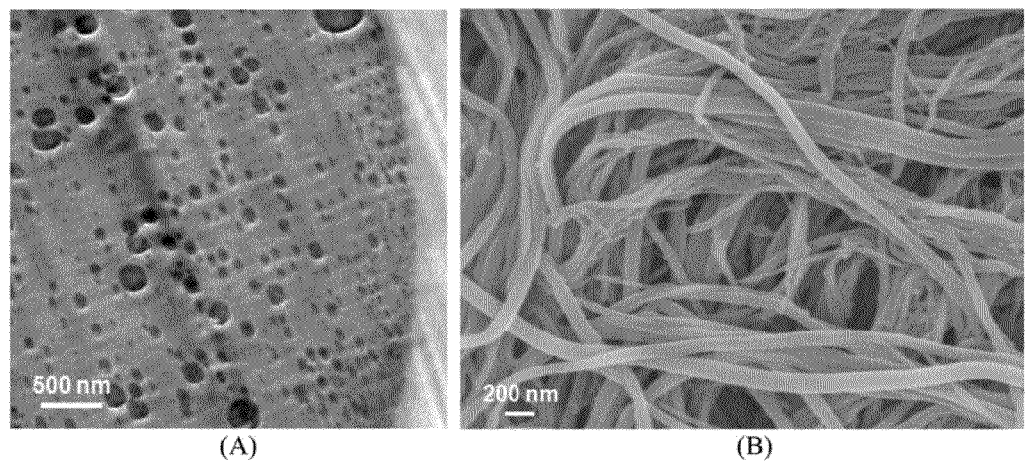
FIG. 4. (A) TEM of a cross section of a fiber melt blown from the blend imbedded in epoxy. (B) SEM of PECTFE nanofibers after removing the PBT matrix. (C) Statistical analysis of diameters in (B).
Figure 4:
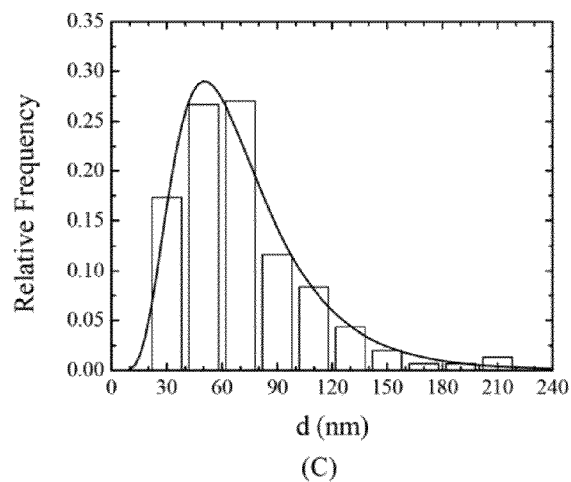

In order to investigate the internal morphology, we embedded fibers in epoxy then microtomed the cured epoxy at room temperature to obtain thin sections. FIG. 4(A) is a TEM image of the cross section of one melt blown fiber. The bright area to the far right is the epoxy matrix. FIG. 4(A) clearly shows circular domains of PECTFE dispersed in the melt blown fiber; there may be some accumulation or migration of a small amount of PECTFE toward to the fiber surface due to its low surface energy. All PECTFE domains in the PBT matrix are well separated from each other. However, TEM can only illustrate projections of PECTFE on a thin section. Depending on the cutting plane through the fiber, only circular or elliptical projections can be seen, and the true morphology of PECTFE phase is difficult to determine.

To further understand the morphology, PBT was selectively removed by soaking fibers in trifluoroacetic acid. After several hours of dissolution the nonwoven mat was filtered, washed, and dried. The remaining mat of fibers constituted about 30 wt % of the original melt blown fibers before soaking, the same as the weight fraction of PECTFE in the blend. Fourier transform infrared spectroscopy (data not shown here) could no longer detect the vibrational peak of carboxyl group from PBT (~1700/cm)s, which confirmed the complete removal of PBT from melt blown fibers. The remaining mat was then coated and examined using SEM. FIG. 4(B) reveals that long PECTFE fibers were obtained after removing the PBT matrix. Fiber ends are nearly completely absent in this and other SEM images, indicating very high aspect ratios. A diameter analysis based on both TEM and SEM images is shown in FIG. 4(C) demonstrating that the fiber diameters range from 30 nm to about 200 nm with a number average diameter of 70 nm. A simple constant volume calculation shows that this corresponds to a 1.3 μm diameter spherical droplet being stretched into a 300 μm long nanofiber with an aspect ratio (length divided by diameter) of more than 4000, i.e., 70 nm diameter.

Figure 5:
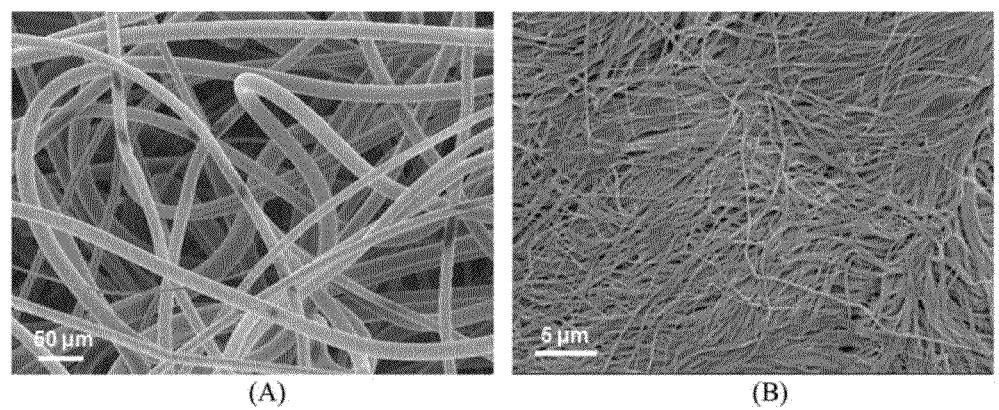
FIG. 5. (A) SEM images of melt blown fibers from polystyrene (PS)/PBT, 15.2 µm and (B) PBT fibers after removing PS matrix, ~250 nm.
Figure 6:
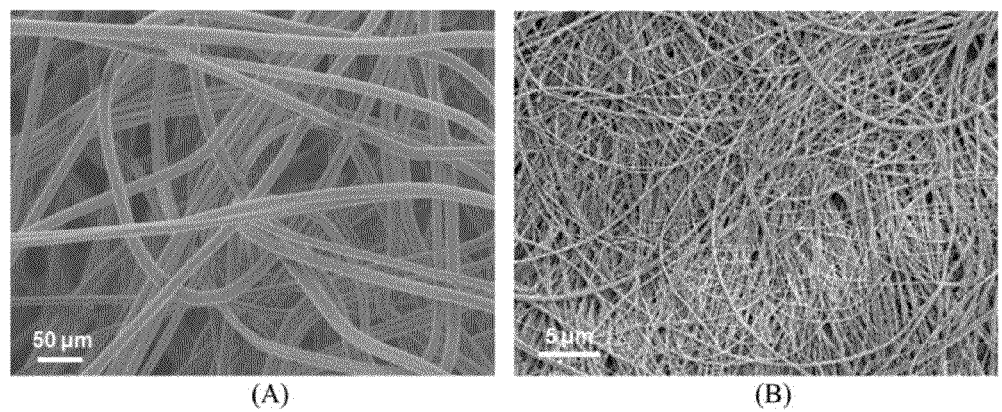
FIG. 6. (A) SEM images of melt blown fibers from PS/PECTFE, 13.5 µm and (B) PECTFE (B) fibers after removing PS matrix, ~200 nm.

Polystyrene (PS) has a solubility parameter in between those of PBT and PECTFE. 75/25 vol % blends of PS/PBT and PS/PECTFE were prepared at the same experimental conditions as the PBT/PECTFE blend. The obtained melt blown fibers are shown in FIG. 5(A) and FIG. 6(A). The number average fiber diameter is 15.2 μm for the PS/PBT fibers and 13.5 μm for the PS/PECTFE fibers, much larger than PBT/PECTFE fibers. However, these fibers are more uniform and narrowly distributed in size. Matrix extraction was easily accomplished by soaking fibers in tetrahydrofuran (THF), a good solvent for PS but one that cannot dissolve PBT or PECTFE. After complete removal of PS, PBT, or PECTFE, fibers were obtained as shown in the SEM images in FIG. 5(B) and FIG. 6(B). Average fiber diameters are around 250 nm for PBT and 200 nm for PECTFE. Since the initial blend droplet size was 10-20 μm the aspect ratio could be more than $10^5$ assuming no breakup during the melt blowing process.

The larger diameter fibers produced by melt blowing the PBT/PECTFE blend can be attributed to the high viscosity of the PS matrix. The viscosity of PS is about 400 Pa·s, one order of magnitude higher than that of PBT and PECTFE. Since PS is the matrix and major component, its higher viscosity will lead to increased melt blown fiber diameters.[8] On the other hand, due to the viscosity mismatch between PS and the minor component, bigger droplets, 10-20 μm, of dispersed phase were formed during melt mixing in the PS matrix. Both factors result in thicker nanofibers (ca. 200 nm) after removing the PS. Nevertheless, the underlying mechanism of fiber-in-fiber formation appears to be scale invariant, i.e., governed simply by geometric factors as illustrated in FIG. 1. Additional studies are underway in our laboratory aimed at better understanding the factors that affect nanofiber formation and size uniformity.

In summary, we demonstrate here a method for producing hierarchical fibers-in-fibers nanofibers in a single drawing step through melt blowing of immiscible polymer blends without bi-component die. Significantly, this appears to be a versatile technique, applicable to any combination of polymers that phase separate subject to the melt blowing criteria that govern the continuous phase and the ability to generate a discontinuous spherical morphology. After washing away the matrix with a selective solvent, we obtained a nonwoven mat of nanofibers formed from the dispersed polymer. Compared to electrospinning this method is faster and should produce even smaller fibers through process and polymer property optimization using a standard capillary meltblown die configuration. These nanofiber nonwoven mats have potential applications as reinforcing fibers in polymer composites and as filter media. The fibers-in-fibers can be collected on a supporting porous layer, and then after flushing away the matrix material, nanofibers will collapse into a dense fiber mat serving as the filter layer.

REFERENCES

1. T. Grafe, K. Graham, *Int Nonwovens J* 2003, 12, 51.
2. J. G. McCulloch, *Int Nonwovens J* 2003, 8, 139.
3. S. J. Russell, *Handbook of Nonwovens*, 1st ed., CRC Press, Woodhead Publications, Boca Raton, Fla., Cambridge, 2007.
4. F. Zhou, R. Gong, *Polym. Int.* 2008, 57, 837.
5. D. H. Reneker, I. Chum, *Nanotechnology* 1996, 7, 216.
6. Q. P. Pham, U. Sharma, A. G. Mikos, *Tissue Eng.* 2006, 12, 1197.
7. C. Burger, B. S. Hsiao, B. Chu, *Annu. Rev. Mater. Res.* 2006, 36, 333.
8. D. H. Tan, C. Zhou, C. J. Ellison, S. Kumar, C. W. Macosko, F. S. Bates, *J. Non-Newtonian Fluid Mech.* 2010, 165, 892.
9. C. J. Ellison, A. Phatak, D. W. Giles, C. W. Macosko, F. S. Bates, *Polymer* 2007, 48, 3306.
10. M. Evstatiev, S. Fakirov, *Polymer* 1992, 33, 877.
11. S. Fakirov, M. Evstatiev, S. Petrovich, *Macromolecules* 1993, 26, 5219.
12. S. Fakirov, M. Evstatiev, *Adv. Mater.* 1994, 6, 395.
13. K. Friedrich, H. E. Kamo, M. Evstatiev, S. Fakirov, *J. Macromol. Sci. Part B. Phys.* 2004, 843, 775.
14. K. Friedrich, M. Evstatiev, S. Fakirov, O. Evstatiev, M. Ishii, M. Harrass, *Comp. Sci. Technol.* 2005, 65, 107.
15. Y. Qin, D. L. Brydon, R. R. Mather, R. H. Wardman, *Polymer* 1993, 34, 1196.
16. Y. Qin, D. L. Brydon, R. R. Mather, R. H. Wardman, *Polymer* 1993, 34, 1202.
17. Y. Qin, *J. App. Polym. Sci.* 1994, 54, 735.
18. Z. Li, M. Yang, J. Feng, W. Yang, R. Huang, *Mater. Res. Bull.* 2002, 37, 2185.
19. Z. Li, M. Yang, A. Lu, M. Feng, R. Huang, *Mater. Lett.* 2002, 56, 756.
20. Z. Li, M. Yang, B. Xie, M. Feng, R. Huang, *Polym. Eng. Sci.* 2003, 43, 615.
21. Z. Li, L. Li, K. Shen, M. Yang, R. Huang, *J. Polym. Sci. Part B: Polym. Phys.* 2004, 42, 4095.
22. Z. Li, L. Li, K. Shen, W. Yang, R. Huang, M. Yang, *Macromol. Rapid Commun.* 2004, 25, 553.
23. D. Wang, G. Sun, B. Chiou, *Macromol. Mater. Eng.* 2007, 292, 407.
24. D. Wang, G. Sun, *Euro. Polym. J.* 2007, 43, 3587.
25. D. Wang, G. Sun, B. Chiou, J. P. Hinestroza, *Polym. Eng. Sci.* 2007, 1, 1865.
26. D. Wang, G. Sun, B. Chiou, *Macromol. Mater. Eng.* 2008, 293, 657.
27. C. Xue, D. Wang, B. Xiang, B. Chiou, G. Sun, *J. Polym. Sci. Part B: Polym. Phys.* 2010, 48, 921.
28. M. Li, R. Xiao, G. Sun, *J. Mater. Sci.* 2011, 46, 4524.
29. M. Li, R. Xiao, G. Sun, *Polym. Eng. Sci.* 2011, 5, 835.
30. M. Li, R. Xiao, G. Sun, *J. App. Polym. Sci.* 2012, 124, 28.
31. N. Fedorova, B. Pourdeyhimi, *J. App. Polym. Sci.* 2007, 104, 3434.
32. Y. B. Choi, S. Y. Kim, *J. App. Polym. Sci.* 1999, 74, 2083.
33. K. Nakata, K. Fujii, Y. Ohkoshi, Y. Gotoh, M. Nagura, M. Numata, M. Kamiyama, *Macromol. Repid, Commun.* 2007, 28, 792.

Example 2

Melt-Blown Blended Polymers for Preparation of Nanofibers

Reference is made to "Tuning the diameter and surface properties of meltblown fibers, Chapter 5, Surface Modification of Meltblown Fibers and the Undesired Side Effect of Shots Formation," doctoral thesis of Dr. Dawud Tan, Oct. 31, 2011, the content of which is incorporated herein by reference in its entirety.

Polymeric Materials

Poly(butylene terephthalate), PBT, (Ticona Celanex 2008), poly(ethylene-co-chlorotrifluoroethylene), PECTFE, (Solvay Halar 1400 LC), and polystyrene, PS (Sigma Aldrich MI 14) were utilized in this example. Two modified forms of PECTFE were also prepared as follows and utilized. PECTFE was grafted with a reactive side group, maleic anhydride, MA (Sigma Aldrich) through a free-radical grafting process. A peroxide initiator, PI, (Arkema Vulcup R) was used in the grafting process. PECTFE was first melted in dioctyl phthalate, DOP, (Sigma Al-drich, Tboiling=384° C.) at 260° C. in a glass reactor filled with argon (Ar) gas. After complete melting of PECTFE in DOP, the reactor was cooled down to room temperature with a water bath and the Ar was vented. The desired amount of MA and PI were then added into the reactor and the reactor was refilled with Ar. The reactor was heated up to 170° C. and stirred for 60 minutes. The vendor specified that the decomposition half-life of PI used here is ≈3 minute at 170° C. The grafting process was stopped by cooling down the reactor to room temperature with a water bath. The grafted material, PECTFE-g-MA, was precipitated out from DOP by using a mixture of methanol/isopropanol (50/50 v/v). PECTFE-g-MA was dried under vacuum at 100° C. to ensure complete removal of methanol and isopropanol. PECTFE-g-MA was melt pressed at 250° C. for 10 minutes under $N_2$ purge to form a 50 μm thick film in a rheometer (TA Instrument ARES). The resulting film was analyzed by FT-IR (Nicolet Magna-IR 750) to qualitatively confirm MA grafting. FT-IR analysis was done under the following conditions: scan time=20, resolution=4 cm−1, range=400-4000 cm−1, room temperature, $N_2$ atmosphere. The same procedure also was repeated, but in the absence of maleic anhydride, and the resulting PECTFE was referred to as PECTFE*.

Polymer Blending

PBT, PS, PECTFE, PECTFE-g-MA, and PECTFE* were used as the polymer blend constituents. Most materials were dried for at least 3 hours under vacuum at 100° C. (except for PS, which was dried at 70° C.) before blending to remove moisture. The polymer blend was produced with a batch compounder (Thermo Haake; 40 cc batch size) at 260° C.

with a blade speed of 50 rpm. The majority phase of the blend was added first to the compounder and the minority phase was added after 10 minutes. The compounder was run for another 10 minutes before the resulting blend was quenched with liquid nitrogen to freeze the blend morphology and minimize degradation.

Polymer Blend Morphology

Figure 7:
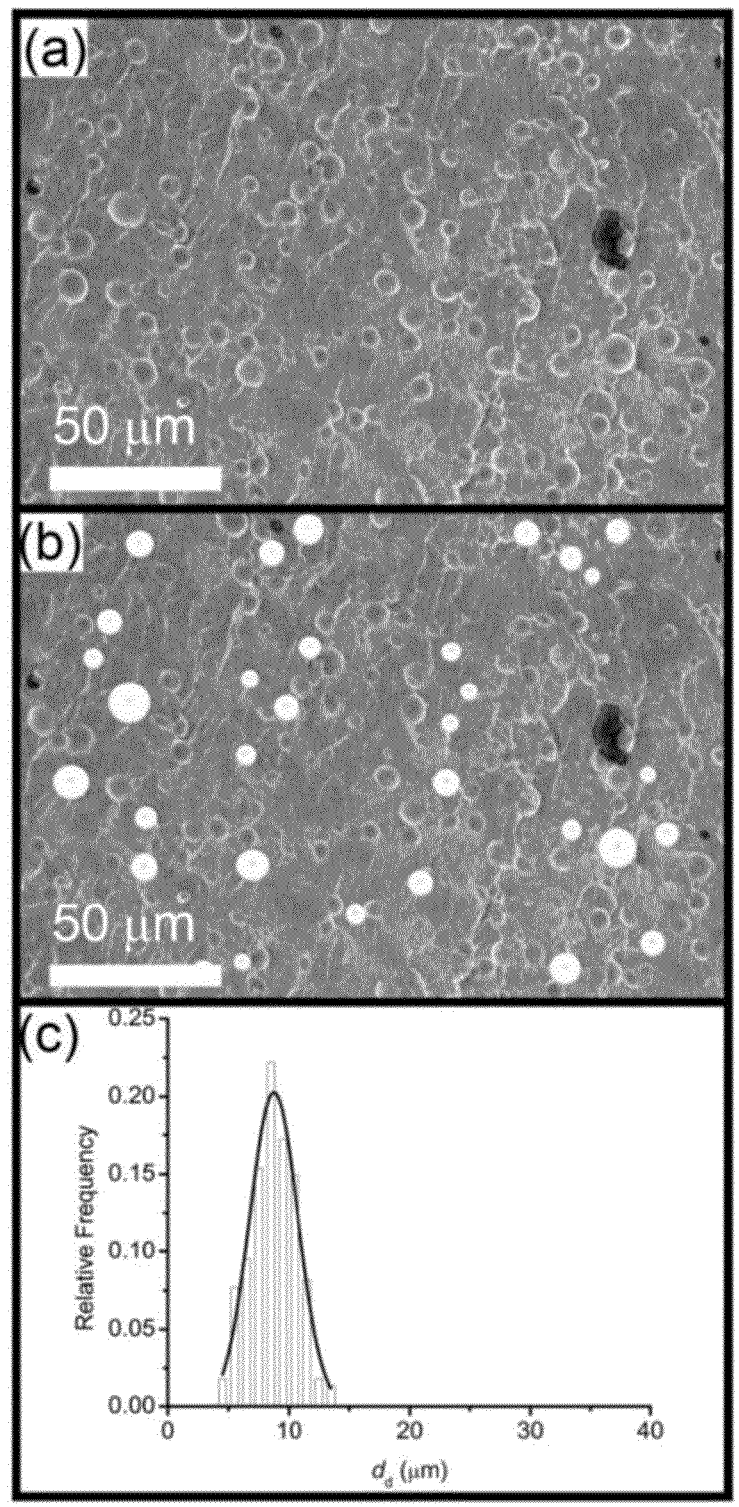
FIG. 7. Determining the morphology of polymer blends. (a) An example of SEM image of a cryo-fractured surface. (b) The same image in which the droplets were fitted with circles, which then were measured in ImageJ. (c) The resulting droplet size distribution ($d_d$=8.8±2.0 µm) fitted with a Gaussian distribution function (line). The sample is PBT/PECTFE 80/20 before annealing.

Each polymer blend was cryofractured in liquid nitrogen and the fractured surface was sputter-coated with 10 nm of Au/Pd (Denton Vacuum 502 A). A scanning electron microscope, SEM, (Hitachi S-4700 or JEOL 6500) was used with 2.0 kV accelerating voltage 10 mm working distance to image the fractured surface, which shows droplet morphology (see FIG. 7(a)). The droplets were fitted with circles (see FIG. 7(b)) and an image analysis software (NIH ImageJ™) was used to calculate the area-average droplet diameter (dd) (see FIG. 7(c).

Melt Blowing

A custom built lab-scale apparatus was used for this study. Most materials were dried under vacuum for at least 3 hours at 100° C. except for PS-containing blends, which were dried at 70° C., before the melt blowing process to remove moisture. Melt blowing experiments were performed at $Q_{polymer}=0.891$ g/min·hole and $P_{inlet}=10$ psig (which corresponds to Γ of $6\times10^{-2}$), $T_{processing}=265°$ C., and 5 holes die. Meltblown fiber mat was collected with a continuous fiber collector, which was located 21 cm from the melt blowing die (die-to-collector distance, DCD) and rotating with a linear speed of 1 cm/s. For each meltblown fiber mat, the fiber diameter distribution was quantified in terms of $d_{av}$ and fiber diameter coefficient of variation (CV), which represents the broadness of fiber diameter distributions. (See Table 1). Shot formation in a fiber mat was quantified as follows. The top surface of a 12 cm long fiber mat was photographed with a digital camera (Canon PowerShot SD 1100 IS) to produce four pictures, each of which contained a 3 cm long section of the fiber mat. Image analysis software (NIH ImageJ™) was used to count the number of shots in all of the pictures. (See Table 1).

TABLE 1

| Sample | # of shots | $d_{av}$ (μm) | CV (%) |
|---|---|---|---|
| PBT | 0 | 5.15 | 46 |
| PECTFE | 0 | 7.84 | 37 |
| PBT/PECTFE 80/20 | 78 | 2.33 | 78 |
| PBT/PECTFE 70/30 (75/25 v) | 69 | 2.34 | 82 |
| PBT/PECTFE 60/40 | 1 | 3.23 | 56 |
| PS/PBT 75/25 v | 0 | 13.48 | 21 |
| PS/PECTFE 73/27 v | 0 | 15.20 | 34 |
| PBT/PECTFE-g-MA 80/20 | 0 | 3.39 | 56 |
| PBT/PECTFE* 80/20 | 122 | 3.07 | 71 |

Polymer Fiber Morphology

Figure 8:
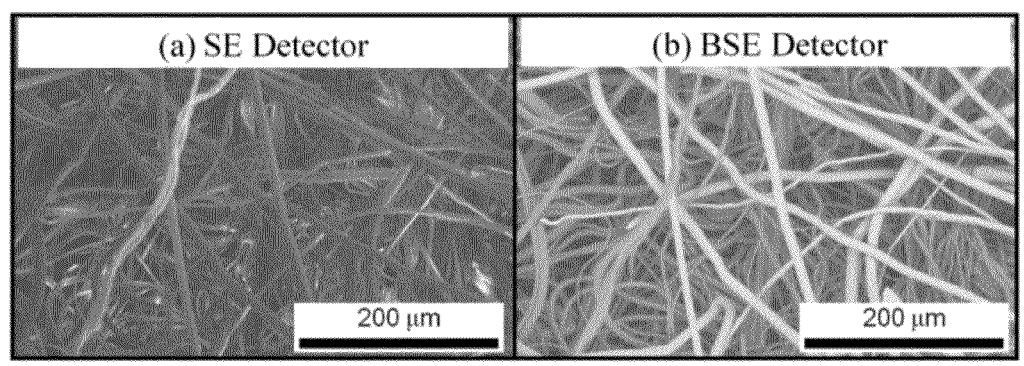
FIG. 8. SEM images recorded with (a) SE and (b) BSE detector of PBT and PECTFE fiber mats stacked together. One fiber appears brighter than the rest in the left side of (a) due to charging effect.

Polymer blend morphology inside the meltblown fibers was determined by partially soaking a fiber mat with trifluoro acetic acid (TFA), a good solvent for PBT, and drying it under vacuum to completely remove TFA. As illustrated by the schematic on the top of FIG. 9, this produced a fiber with two distinct zones: one zone containing fibers with both PBT and PECTFE still intact and another zone with fiber that only has PECTFE remaining. The fiber mat was sputter coated with 2 nm of platinum (VCR Group Inc. 700) and SEM (Hitachi S-4700 or JEOL 6500) was used to probe the transition area between the two zones at 10 mm working distance while using the secondary (SE) and back-scattered electron (BSE) detectors. (See FIG. 8 and FIG. 9). The phase containing atoms with higher atomic numbers (i.e., F and Cl in PECTFE) appears brighter than the other phase (i.e., PBT) because it produces more back-scattered electrons.

Figure 10:
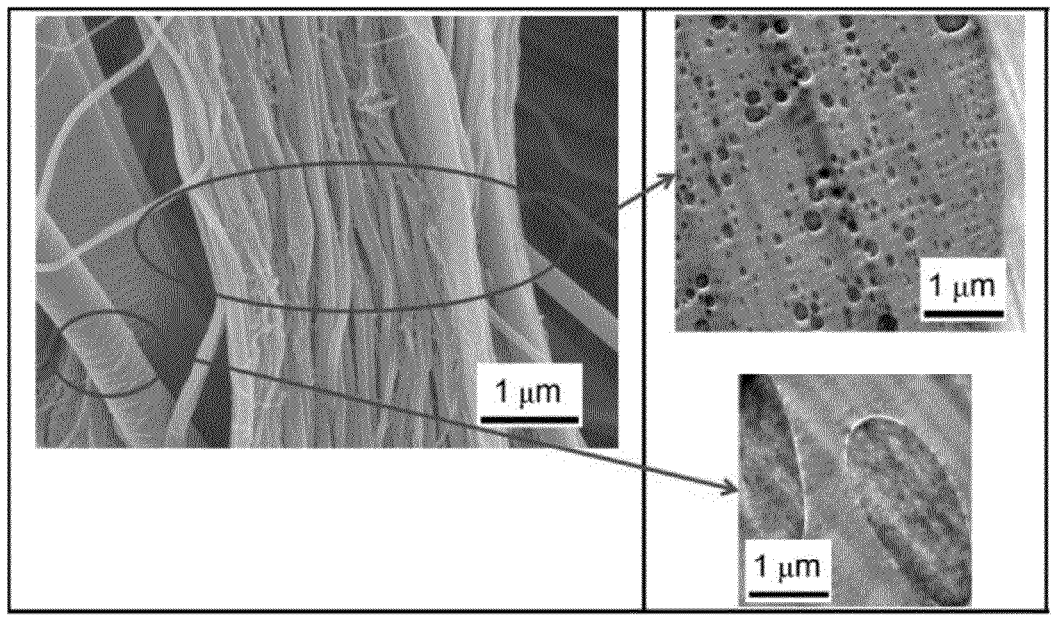
FIG. 10. An SEM image from an SE detector (left) shows the island dimensions are in agreement with those observed in TEM images (right). The sample is PBT/PECTFE 80/20.

Transmission electron microscopy (TEM) (FEI Tecnai T12) analyses were performed by Feng Zuo (UMN) with 100 kV accelerating voltage. Meltblown fibers were embedded in an epoxy matrix (Ted Pella LR White) and cryo-microtomed perpendicular to the fiber long axis to produce 100 nm thin cross-sections, which were imaged under TEM. FIG. 10 show that the minor phase containing atoms with higher atomic numbers (i.e., F and Cl in PECTFE) appears darker than the major phase (i.e., PBT) due to greater scattering of electrons, resulting in fewer electrons transmitted to the TEM detector. Polymer blend morphology within the shots was determined by carefully isolating several shots from the fiber mat. These shots were stirred in TFA at room temperature for 12 hours to dissolve the PBT phase and the resulting solution was filtered with a Teflon filter (average pore size of 500 nm, Millipore FG). A 1 cm×1 cm section of the filter was cut, sputter coated with 10 nm Au/Pd (Denton Vacuum DV 502 A), and visualized by SEM (Hitachi S-4700 or JEOL 6500) with 2.0 kV accelerating voltage at 10 mm working distance.

PBT/PECTFE 80/20: Polymer Blend Morphology

Polymer blend morphology in the starting material was analyzed. As indicated in Table 2, the PECTFE droplet size distributions in the PBT/PECTFE 80/20 starting material before and after quiescent annealing (260° C. for 30 minutes), which indicate that the droplets coalesce during quiescent annealing. This is relevant to the melt blowing process because the starting material was held at 265° C. for approximately 30 minutes before meltblown into fiber mats.

TABLE 2

| | PECTFE droplet size distribution, $d_{d,av} \pm w$ (μm) | |
|---|---|---|
| Sample | Before annealing | After annealing |
| PBT/PECTFE 80/20 | 8.8 ± 2.0 | 11.3 ± 3.6 |
| PBT/PECTFE 70/30 | 11.6 ± 2.3 | 14.7 ± 3.7 |
| PBT/PECTFE 60/40 | 13.7 ± 2.9 | 18.4 ± 6.6 |
| PBT/PECTFE-g-MA 80/20 | 7.5 ± 1.9 | 8.9 ± 2.8 |

Figure 9:
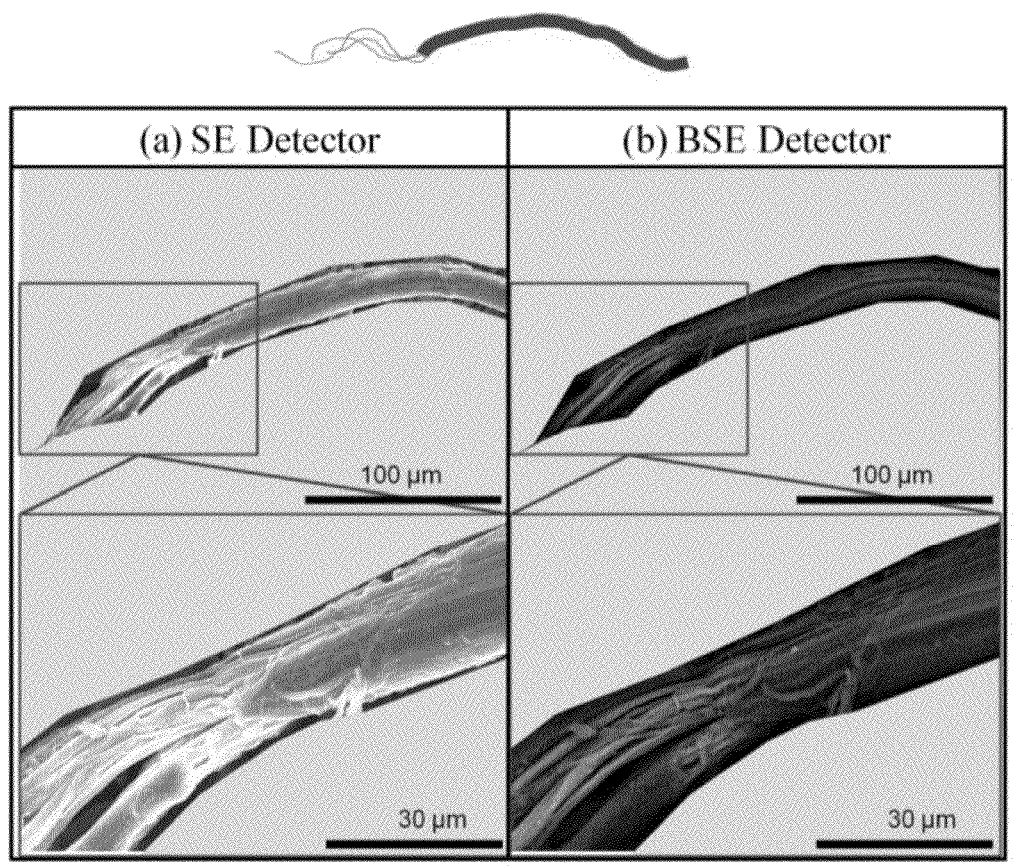
FIG. 9. The morphology in a meltblown fiber produced from a polymer blend. SEM images recorded with the (a) SE and (b) BSE detectors showing the transition zone at two different levels of magnification. The schematic on the top depicts the transition zone in a single fiber. The material is PBT/PECTFE 80/20.

Polymer blend morphology within the meltblown fibers was determined by searching for the transition zone described above. A schematic on the top of FIG. 9 illustrates the transition zone, one in which a large fiber dissociated into multiple small fibers. FIGS. 9(a) and (b) shows the SEM images recorded with the SE and BSE detectors, respectively, of the transition zone in a single fiber. FIG. 9(a) shows topographically the dissociation of PECTFE nanofibers from the parent PBT/PECTFE microfiber and the brightness difference in the image from BSE detector shown in FIG. 9(b) confirms that the dissociated nanofibers are PECTFE nanofibers. FIG. 10 shows that the nanofibers dimensions measured from an SEM image are in good agreement with those measured from TEM images. The TEM images in FIG. 10 show some PECTFE fibers with oblong cross-sections, which is likely due to cryo-microtoming the fibers at an oblique angle relative to the long axis.

SEM and TEM images in FIG. 9 and FIG. 10 indicate that the morphology in the meltblown fibers is the so called "island-in-the-sea structure," which is comprised of small PECTFE nanofibers (islands) embedded in a matrix of larger PBT fibers (sea). The PECTFE within the meltblown fibers have a small $d_{av}$ (≈300 nm) and very high aspect ratios (≥$10^4$) while the PECTFE within the starting material have a large $d_{d,av}$ (≈10,000 nm) and aspect ratios of ≈1. Both of these are indicative that the droplets stretching and merging has produced an island-in-the-sea morphology from melt blowing.

Figure 12:
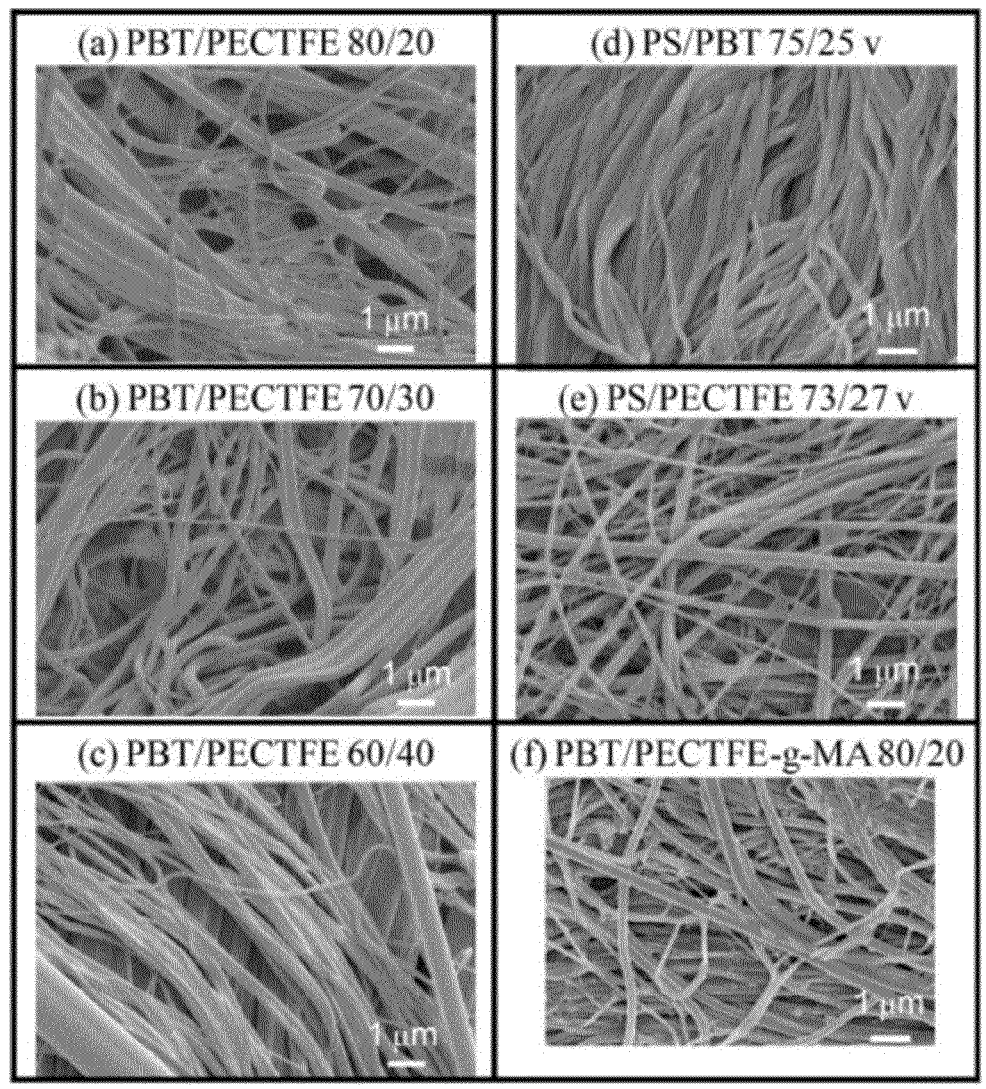
FIG. 12. Nanofibers that were produced upon the removal of the major phase of the blend. (a) PBT/PECTFE 80/20. (b)

Significantly, FIG. 12 shows that the island-in-the-sea morphology can be exploited to produce nanofibers ($d_{av}$=300 nm) by melt blowing a polymer blend at a "mild" operating conditions ($Q_{polymer}$=0.9 g/min·hole, $P_{inlet}$=10 psig; $\Gamma \approx 6 \times 10^{-2}$) and subsequently removing the major phase of the blend. The SEM image in FIG. 10 shows that the nanofibers are bundled together after the removal of the major phase and may be further separated into individual strands if desired.

Figure 11:
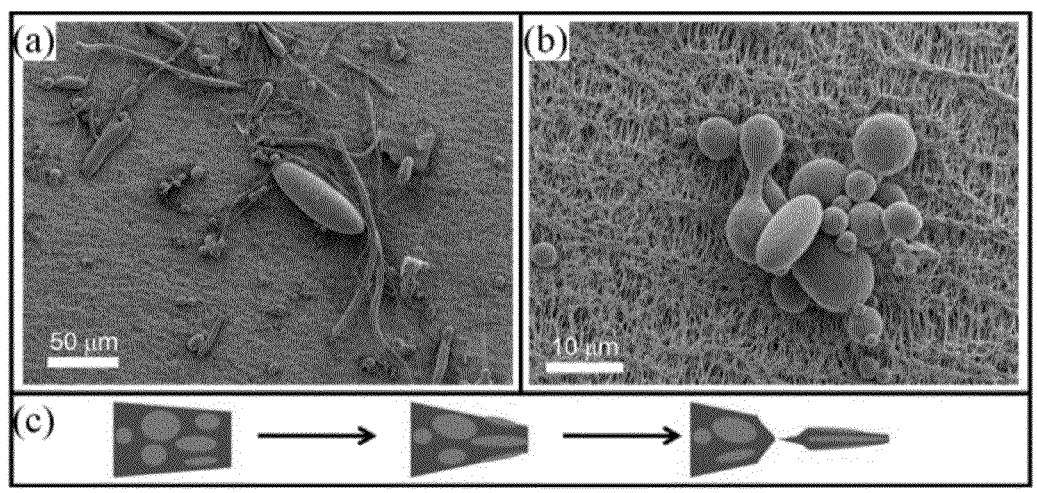
FIG. 11. The PECTFE morphology in the shots. (a)-(b) SEM images showing different shapes of PECTFE droplets found in the shots. The rough background is a Teflon filter. (c) An illustration of a hypo-thesis for the failure mechanism responsible for the shot formation.

The blend morphology within the shots also was assessed. SEM images in FIGS. 11 (a) and (b) indicate that the PECTFE droplets in the shots are in the form of a perfect sphere, elongated droplet, partially merged droplet, or rod. Moreover, these droplets have diameters and aspect ratios that resemble the PECTFE droplets in the starting material more than those in the meltblown fibers. This likely indicates that the shot formation is due to failure to: 1) significantly stretch individual droplets, and/or 2) merge multiple droplets with each other to form the PECTFE islands in the meltblown fibers. (See FIG. 11(c)). A droplet cannot be stretched indefinitely; eventually breakup occurs and the fiber stream becomes discontinuous. Thus, two factors should favor production of a uniform fiber mat from a highly incompatible polymer blend: 1) increase the number of droplets available for merging while being stretched and/or 2) improve the blend compatibility.

PBT-PECTFE Blends: Increasing the PECTFE Weight Fraction

The influence of PECTFE weight fraction was investigated with regards to the properties of the fiber mats. Table 1 shows that the fiber mat becomes more uniform with increasing amounts of PECTFE and the shot formation is completely suppressed at the highest PECTFE content, 60/40. This seems to corroborate the hypothesis that more droplets merging will suppress shot formation. Table 2 shows that the droplet coalescence under quiescent annealing is more significant in the higher weight fraction blends. Nevertheless, the total volume occupied by the droplets is the larger with increasing weight fraction, thus increasing the ability of stretched droplets to merge with each other and suppressing shot formation and decreasing CV. Table 1 shows that the 60/40 blend has the lowest CV value. Table 1 also shows that the day of the 60/40 blend is slightly higher but it is not statistically significant in comparison to the 80/20 and 70/30 blends. Increasing the PECTFE weight fraction is one possible method to eliminate the undesired shot formation. The fiber mats from the 70/30 and 60/40 blends also have an island-in-the-sea fiber morphology. FIGS. 12(b) and (c) show that upon PBT dissolution with TFA, the remaining PECTFE fiber mats from PBT/PECTFE 70/30 and PBT/PECTFE 60/40 have $d_{av}$ of 250 and 200 nm, respectively.

PBT-PECTFE Blends: Increasing Compatibility with PS

PBT or PECTFE was blended separately with PS to improve the blend compatibility. The solubility parameter of PS, $\delta PS$=8.7 $(cal/cm^3)^{1/2}$, is approximately in between the solubility parameters of PBT and PECTFE (10.8 and 7.5 $((cal/cm^3)^{1/2}$, respectively). PS/PBT and PS/PECTFE blends were prepared and compared with the PBT/PECTFE blend while matching the volume fractions in each blend ($\approx$75/25 v). Matching the volume fraction rather than the mass fraction is appropriate because this is the parameter that governs droplet merging. Thus, ensuring a constant volume fraction will equalize the probability of droplet merging in all the different blends.

All the blends were meltblown and compared only with respect to fiber mat uniformity. Improving the blend compatibility clearly helps suppress the shot formation. The use of PS compatibilizes the PS/PBT and PS/PECTFE blends, which can be measured by the interaction parameter between blend constituents ($\chi AB \sim (\delta A - \delta B)$). A lower interaction parameter means a thicker interfacial thickness and more interfacial entanglements, which might reduce interfacial slip during flow and improve stress transfer across the interface. Both factors might improve the droplet stretching during the fiber formation process, produce a more continuous stream of meltblown fibers, and thus reduce shot formation.

Table 1 shows that PS/PBT and PS/PECTFE fiber mats have higher $d_{av}$ than that of PBT/PECTFE fiber mat, which is probably due to the higher viscosity of the blend majority PS. Table 1 also shows that PS/PBT and PS/PECTFE fiber mats do not have any shots and have low CV values. PS/PBT and PS/PECTFE fiber mats also exhibit island-in-the-sea fiber microstructure. FIGS. 12 (d) and (e) show that upon PS dissolution with tetrahydrofuran (THF), the remaining PBT and PECTFE fiber mats have $d_{av}$ of 260 nm and 200 nm, respectively.

CONCLUSION

Fiber mats were meltblown from a blend comprised of combinations of PBT, PECTFE, and/or PS. Polymer blend morphologies within the starting material, meltblown fibers, and shots were examined. The starting material has droplet morphology while the meltblown fibers exhibit a morphology called island-in-the-sea (e.g., a bundle of PECTFE nanofibers embedded in a matrix of PBT microfiber). The morphology in the shots is closer to the morphology of the starting material. Significantly, the island-in-the-sea morphology in the meltblown fibers presents an opportunity to produce nanofibers by 1) melt blowing a polymer blend at operating conditions similar to those currently used in industry, and 2) removing the major phase with a selective solvent to expose the nanofibers.

It will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

Citations to a number of patent and non-patent references are made herein. The cited references are incorporated by reference herein in their entireties. In the event that there is an inconsistency between a definition of a term in the specification as compared to a definition of the term in a cited reference, the term should be interpreted based on the definition in the specification.

The invention claimed is:

1. A method comprising melt-blowing a blend of a first polymer and an immiscible second polymer to form a composite polymeric fiber having an island-in-sea morphology, wherein the first polymer forms a matrix that surrounds the second polymer and the second polymer forms nanofibers within the matrix, the nanofibers having an average diameter of less than about 500 nm, and wherein the second polymer comprises poly(ethylene-co-chlorotrifluoroethylene) (PECTFE).

2. The method of claim 1, wherein the nanofibers have an average diameter of less than about 400 nm.

3. The method of claim 1, wherein the nanofibers have an average diameter of less than about 300 nm.

4. The method of claim 1, wherein the nanofibers have an average diameter of less than about 200 nm.

5. The method of claim 1, wherein the nanofibers have an average diameter of less than about 100 nm.

6. The method of claim 1, wherein the nanofibers have an aspect ratio of at least about 1000.

7. The method of claim 1, wherein the nanofibers have an aspect ratio of at least about 10000.

8. The method of claim 1, wherein the first polymer and the second polymer are present in the blend at a volume ratio of between about 95:5 and 50:50.

9. The method of claim 1, wherein the first polymer and the second polymer are present in the blend at a volume ratio of between about 80:20 and 60:40.

10. The method of claim 1, wherein the first polymer and the second polymer have an interactive solubility parameter ($\chi$) of greater than about 0.

11. The method of claim 1, wherein the first polymer and the second polymer have an interactive solubility parameter ($\chi$) of greater than about 1.

12. The method of claim 1, further comprising treating the composite fiber with a solvent that dissolves the matrix from the composite fiber and that does not dissolve the nanofibers.

13. The method of claim 1, wherein the first polymer comprises polybutylene terephthalate (PBT).

14. The method of claim 1, wherein the blend further comprises one or more additives selected from a group consisting of anti-oxidants, anti-stats, blooming agents, colorants, flame retardants, lubricants, peroxides, stabilizers, and wetting agents.

15. The method of claim 1, wherein the blend is melt-blown through a die having one or more orifices with diameters of about 0.05-2 mm.

16. The method of claim 1, wherein the nanofibers have a basis weight of about 1-500 g/m2.

17. The method of claim 1, wherein the nanofibers have a basis weight of about 5-500 g/m2.

18. The method of claim 1, wherein processing temperature of the blend (Tp) is maintained at about 200-400° C. during melt-blowing.

19. The method of claim 1, wherein air temperature (Ta) is maintained at about 200-400° C. during melt-blowing.

20. The method of claim 1, wherein air mass flow rate during melt-blowing is between about 1-30 standard cubic feet per minute (SCFM).

21. The method of claim 1, wherein the blend is fed during melt-blowing at a mass flow rate of about 0.01-2.00 g/min/hole.

22. The method of claim 1, wherein pressure at die exit during melt-blowing is less than 100 psig.

23. The method of claim 1, wherein pressure at die exit during melt-blowing is less than 50 psig.

24. The method of claim 1, wherein pressure at die exit during melt-blowing is less than 25 psig.

\* \* \* \* \*